United States Patent [19]
Scherer et al.

[11] 3,708,998
[45] Jan. 9, 1973

[54] AUTOMATIC EXPANSION VALVE, IN LINE, NON-PILOTED

[75] Inventors: Carl A. Scherer, Clarence Center; Paul K. Beatenbough, Medina, both of N.Y.

[73] Assignee: General Motors Corporation, Detroit, Mich.

[22] Filed: Aug. 5, 1971

[21] Appl. No.: 169,300

[52] U.S. Cl. ........................62/210, 62/224, 236/92
[51] Int. Cl. ................................................F25b 41/00
[58] Field of Search ...62/204, 210, 222, 224; 236/92

[56] References Cited

UNITED STATES PATENTS 1,659,918   2/1928   Lipman ................................62/224
2,056,482   10/1936  Philipp ................................62/222

Primary Examiner—Meyer Perlin
Attorney—W. S. Pettigrew et al.

[57] ABSTRACT

Refrigerating apparatus for an automobile air conditioning system including an expansion valve with a tubular housing separated into a metering and a control portion by a wall separating member and having an inlet between the metering portion and the condenser and an outlet between the metering portion and the evaporator. A valve member and a passage between the inlet and outlet regulates the supply of refrigerant to the evaporator. A diaphragm within the control portion which has one side exposed to refrigerant pressure from the evaporator and the other side exposed to a reference or control pressure within a sealed chamber moves the valve to an open position in response to decreasing refrigerant pressure in the evaporator. This increases evaporator pressure above a predetermined level to prevent frost accumulation on the evaporator.

3 Claims, 4 Drawing Figures

PATENTED JAN 9 1973
3,708,998
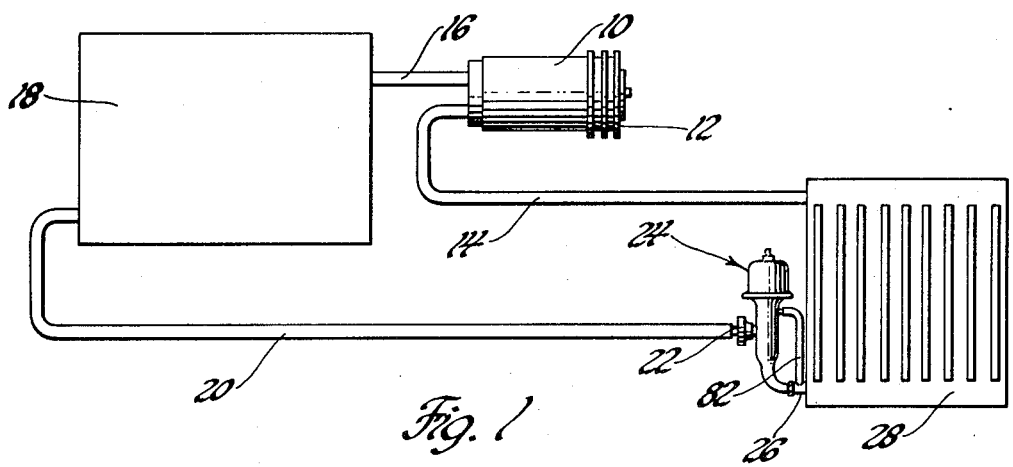
Fig. 1
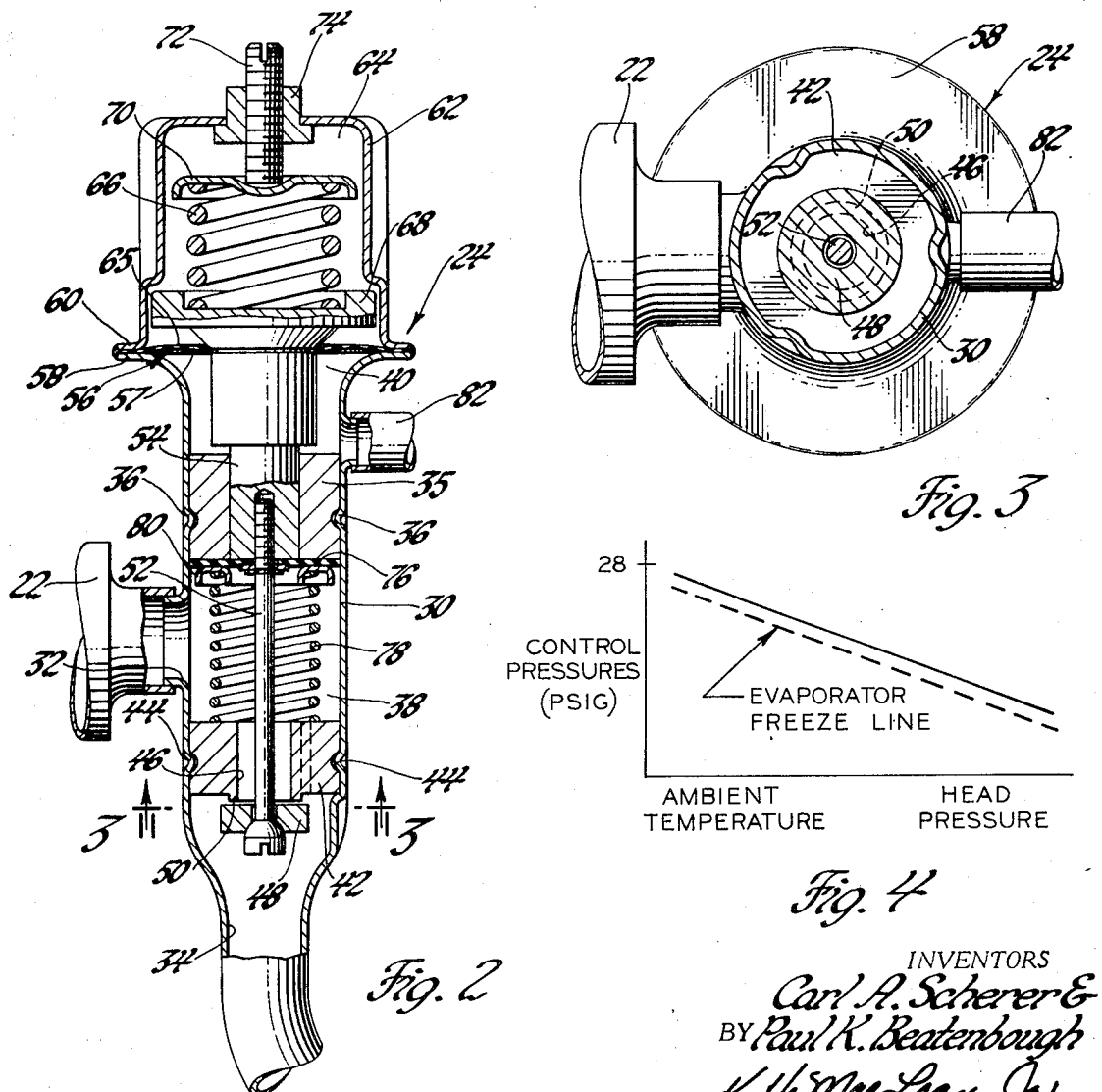
Fig. 2
Fig. 3
Fig. 4
INVENTORS
Carl A. Scherer &
BY Paul K. Beatenbough
K. H. MacLean, Jr.
ATTORNEY

AUTOMATIC EXPANSION VALVE, IN LINE, NON-PILOTED

This invention relates to refrigerant apparatus for auto air conditioning systems including an evaporator pressure responsive expansion valve.

When refrigerant compressors are driven by the engine of an automobile as in most auto air conditioning systems, there is a tendency for the evaporator to form frost when the ambient temperatures are cool and engine speeds are relatively large. Evaporator temperatures which cause frost formation correspond to evaporator pressures less than a predetermined level. Throttling valves in the evaporator outlet of the system to restrict refrigerant flow from the evaporator and thus maintain pressure in the evaporator have been used to prevent frost formation. Another method for preventing frosting of the evaporator is apparatus for cycling the compressor clutch off and on to prevent the evaporator's temperature from falling below the freezing point. The present expansion valve eliminates the need for throttling valves and cycling apparatus by controlling the quantity of refrigerant into the evaporator to maintain refrigerant pressure therein and prevent freezing temperatures.

More specifically the present expansion valve directly responds to evaporator inlet pressure to supply sufficient refrigerant to the evaporator for maintaining its pressure above a predetermined freeze level. The present expansion valve includes a tubular housing divided into a control portion and a metering portion by a separation wall. An outlet in the tubular member connects the metering portion and the evaporator inlet and an inlet connects the condenser to the metering portion. A valve seat member having a valved passage between the inlet and outlet and regulates the supply of refrigerant introduced to the evaporator. A valve member adjacent the passage is moved between open and closed positions by a diaphragm within the control portion. The diaphragm has one side exposed to evaporator inlet pressure and the other side exposed to a reference or control pressure. When the evaporator inlet pressure decreases, the diaphragm and valve member move to open the passage and admit more liquid refrigerant into the evaporator to increase the evaporator pressure. When the evaporator inlet pressure increases in response to an increased supply of refrigerant, the diaphragm and valve member move toward a more closed position.

Unlike many prior thermally responsive expansion valves which are operated in response to evaporator temperatures and which maintain a superheated vapor condition at the evaporator outlet, the present pressure responsive expansion valve floods the evaporator with refrigerant anytime the compressor's capacity tends to exceed the heat load on the evaporator. Superheat temperature of refrigerant vapor is defined as the temperature of the refrigerant above its boiling point for any given pressure. Thus, when the expansion valve opens and floods the evaporator under the aforesaid conditions, the pressure of refrigerant in the evaporator inlet remains above the predetermined pressure level which prevents frost formation on the evaporator.

Under operation during low compressor speed with a large heat load on the evaporator, the heat load will tend to exceed the compressor's capacity. This tends to produce relatively high pressure levels in the evaporator and causes the expansion valve to move toward a closed position to lower the evaporator pressure. The more closed position of the expansion valve creates a greater withdrawal rate from the evaporator than the rate of refrigerant entering the evaporator, thus lowering evaporator pressure. Because the passage of the expansion valve may close under these conditions, it may be desirable to provide a continually open leakage passage in the expansion valve. This leakage will improve the performance of the refrigerating apparatus when the automobile is idling by producing the optimum air discharge temperature into the passenger compartment under these conditions.

Therefore, it is an object of this invention to provide automobile refrigerating apparatus including an expansion valve to supply sufficient refrigerant to an evaporator during high ambient temperature and highway operation to maintain pressure therein which will prevent the evaporator's temperature from falling below a frost forming temperature.

It is a further object of this invention to provide automobile refrigerating apparatus including an expansion valve responsive to evaporator inlet pressure to supply sufficient refrigerant to the evaporator during high ambient temperature highway operation to prevent evaporator temperatures from falling below a frost forming temperature even while the compressor is withdrawing refrigerant from the evaporator at a high rate.

Further objects and advantages of the present invention will be apparent from the following detailed description, reference being had to the accompanying drawings, in which a preferred embodiment of the invention is clearly shown.

In the drawings:

FIG. 1 is a diagrammatic view of an automobile air conditioning system employing the subject expansion valve;

FIG. 2 is a vertical sectional view of the expansion valve which is shown in FIG. 1;

FIG. 3 is a sectional view of the expansion valve taken along section line 3—3 in FIG. 2 and looking in the direction of the arrow;

FIG. 4 is a plot of control pressure in the evaporator inlet versus ambient temperature and head pressure.

Referring to FIG. 1, there is illustrated a refrigerant compressor 10 provided with a belt pulley 12 adapted to be driven at a fixed speed ratio to the engine by a belt from a pulley on the crankshaft of the automobile internal combustion engine (not shown). The compressor 10 withdraws evaporated refrigerant from the suction conduit 14, compresses the refrigerant and pumps it through the discharge conduit 16 into the air cooled condenser 18 which is normally located in front of the automobile radiator.

The compressed refrigerant is cooled and liquefied in the condenser 18 and flows therefrom through the conduit 20 to a fitting 22 through which it discharges into a pressure responsive expansion valve 24. The high pressure refrigerant from the compressor 10 and condenser 18 is expanded subsequent to flow through the expansion valve 24. It then passes through an inlet 26 of an evaporator 28 where it absorbs heat from air passing through the evaporator and into the passenger compartment.

Details of the expansion valve 24 are more clearly shown in FIGS. 2 and 3. A tubular housing 30 has an inlet passage 32 to which fitting 22 is adapted to be connected and an outlet passage 34 which discharges refrigerant into the inlet 26 of evaporator 28. A wall member 34 is secured within the interior of tubular housing 30 by crimped portions 36 in the housing and divides the interior of the housing 30 into a lower metering chamber portion 38 and an upper control chamber portion 40.

A valve seat member 42 is secured within the tubular housing 30 between the inlet 32 and the outlet 34 by crimped portions 44 in the housing. Valve seat member 42 has a passage 46 therein through which refrigerant from the inlet 32 flows to the outlet passage 34 and evaporator 28. A valve member 48 is supported adjacent the lower side of the valve seat member 42 and is adapted to coact with the valve seat ridge 50 to regulate the flow of refrigerant through passage 46. A valve rod member 52 extends from the valve member 48 through passage 46, metering chamber portion 38 and is threadably secured to a member 54. The member 54 is reciprocally mounted in the wall member 34 and extends into control chamber 40 where it engages a central portion of a flexible diaphragm 56 which has a side 57 exposed to pressure in chamber 40. Diaphragm 56 is secured at its peripheral edge between outwardly extending flange portions 58 and 60 of the housing 30 and a cup-shaped member 62. Flange portions 58 and 60 are secured together by brazing.

The cup-shaped member 62 encloses a chamber 64 exposed to the upper side 65 of diaphragm 56. Chamber 64 is maintained at a vacuum or substantially constant reference pressure. A compression-type coil spring 66 presses against an enlarged portion 68 of follower 54. A backup plate 70 engages the upper end of coil spring 66 and is biased downward by an adjusting screw 72 which is threadably secured in a bushing 74. The screw 72 may be adjusted to place a predetermined load on the diaphragm 56 and follower 54.

Refrigerant leakage between the metering chamber 38 and the control chamber 40 is prevented by a flexible seal member 76 which is secured between the bottom of member 54 and the valve rod 52. The peripheral edge of the seal member 76 is held against the member 34 by a coil spring 78 and valve plate 80.

The control chamber 40 communicates with the inlet of the evaporator 28 through an external conduit 82 or a conduit inside valve 24 which transmits refrigerant pressure from the evaporator inlet to the control chamber 40 where it contacts one side 57 of the diaphragm 56. The other side 65 of the diaphragm 56 is exposed to air, refrigerant or vacuum at a substantially constant pressure within chamber 64. When the evaporator inlet pressure increases, the diaphragm 56 and follower 54 are moved upward against coil spring 66 and the pressure in chamber 64. This moves the valve rod 52 and connected valve member 58 against the bottom end of valve seat member 42 to close passage 46. When refrigerant pressure in the evaporator inlet decreases, the diaphragm 56 moves the follower 54, the valve rod 52 and valve element 48 downward to open passage 46. In this manner, refrigerant pressure in the evaporator 28 is maintained above a frost forming pressure level.

Unlike thermally responsive expansion valves which sense refrigerant temperature at the evaporator outlet, refrigerant superheat temperature may not be maintained. For example, whenever the compressor's capacity tends to exceed the heat load on the evaporator which corresponds to many high ambient highway conditions, the present expansion valve is relatively wide open and the evaporator is flooded with refrigerant from the condenser. This has an advantage in parallel finned tube-type evaporators which have a tendency to develop hot spots caused by superheated refrigerant on one side of the evaporator. The flooding of the evaporator caused by the opening of expansion valve tends to wash out these hot spots. Under conditions of high evaporator load and low compressor speed, which occurs when a motor vehicle is idling, the expansion valve tends to close for maintaining evaporator pressure. Refrigerant superheat temperature refers to the temperature of refrigerant vapor above its boiling point for a given pressure.

A refrigerant commonly used in automotive air conditioning systems is a fluorocarbon compound having the general formula $CCl_2F_2$ and commonly referred to as refrigerant 12. It changes from a liquid to a vapor at a temperature slightly above 32° F. under a pressure of approximately 30 psig. When the load on the evaporator is relatively small, it is desirable to maintain the evaporator's refrigerant pressure above 28 psig to prevent frost formation caused by evaporator fin temperature falling below 32° F. It has been observed, however, that under high ambient temperature conditions, the pressure in the evaporator may be maintained at a lower pressure than 28 psig without frost accumulation on the evaporator. This is explained by the increased rate of heat input to the evaporator because of the high ambient temperature of air flowing through the evaporator and to an increased temperature differential across the faces of the evaporator. FIG. 4 illustrates this observation which shows the relation of control pressure in chamber 40 to ambient temperature for a given evaporator and refrigerant system. The broken line represents the evaporator freeze line below which frost will accumulate at corresponding control pressures and ambient temperatures. The present expansion valve lowers the control pressure within chamber 40 under high ambient temperatures by selecting the area of valve member 48 and seal member 76 to cause head pressure from the condenser to exert a closing force on the valve in opposition to the force caused by decreasing pressure within the control chamber 40. Head pressure in this instance refers to the refrigerant pressure from the condenser outlet. Head pressure has been found to be relatively independent of compressor speed but proportional to changes in ambient temperature. Thus increased ambient temperatures produce proportionate increases in head pressure over a given speed range. This explains the dual labeling of the horizontal axis of the graph in FIG. 3.

The subject expansion valve utilizes the relation between ambient temperature and head pressure to effectively decrease the control pressure and thus the evaporator pressure with increases in head pressure (ambient temperature). Specifically, the area of the seal 76 exposed to head pressure in chamber 38 is larger than the area of valve member 48 exposed to the same head pressure. The net force on the connected valve 48 and valve rod 52 is to close the passage 46 at a higher control pressure in chamber 40 than would be the case without this head pressure compensation. The supplemental closing force causes a lower pressure to be maintained in control chamber 40 and the evaporator 28. The control pressure relation to ambient temperature and head pressure for a given compressor speed is shown in a solid line in FIG. 4. The relative areas of seal 76 and valve member 48 which are exposed to head pressure can be altered to produce a desirable control pressure profile nearly paralleling the evaporator freeze line as in FIG. 4.

Certain evaporator configurations exhibit a marked pressure drop from their inlet to their outlet while others have a very small pressure drop. With evaporators of the first kind, it may be desirable to control the expansion valve by evaporator outlet pressure rather than inlet pressure. This is readily accomplished by connecting the conduit 82 to the evaporator outlet instead of the inlet.

While the embodiment of the present invention as herein described and illustrated constitutes a preferred form, it is to be understood that other forms might be adapted.

What is claimed is as follows:

1. Refrigerating apparatus for an automobile air conditioning system comprising:

an evaporator having an inlet and an outlet; expansion valve means including a tubular housing with a wall member therein separating the housing into a control chamber portion and a metering chamber portion; means including a refrigerant compressor, a condenser and an inlet in said tubular housing to said metering chamber for withdrawing refrigerant from said evaporator, compressing it and passing it into said metering portion; an outlet from said metering portion adapted to be connected to the inlet of said evaporator for introducing refrigerant into said evaporator; a valve seat member within said metering portion between said inlet and outlet; said valve seat member having a passage through which refrigerant flows from said compressor to said evaporator; a valve member movable with respect to said valve seat member to open and close said passage for controlling the flow of refrigerant through said passage; a valve rod connected to said valve member extending through said metering portion and said wall member into said control chamber; means for fluidly connecting said control chamber with said evaporator inlet for transmitting evaporator inlet pressure to said control chamber; a diaphragm in said control chamber having one side exposed to evaporator inlet pressure in said control portion and a second side exposed to a substantially constant pressure; means including said valve rod operatively connecting said diaphragm and said valve member for opening said passage in response to decreasing pressure in said control chamber which acts against said diaphragm and for closing said passage in response to increasing refrigerant pressure.

2. Refrigerating apparatus for an automobile air conditioning system comprising:

an evaporator having an inlet and an outlet; expansion valve means including a tubular housing with a wall member therein separating the housing into a control chamber portion and a metering chamber portion; means including a refrigerant compressor, a condenser and an inlet in said tubular housing to said metering chamber for withdrawing refrigerant from said evaporator, compressing it and passing it into said metering portion; an outlet from said metering portion adapted to be connected to the inlet of said evaporator for introducing refrigerant into said evaporator; a valve seat member within said metering portion between said inlet and outlet; said valve seat member having a passage through which refrigerant flows from said compressor to said evaporator; a valve member movable with respect to said valve seat member to open and close said passage for controlling the flow of refrigerant through said passage; a valve rod connected to said valve member extending through said metering portion and said wall member into said control chamber; means for fluidly connecting said control chamber with said evaporator inlet for transmitting evaporator inlet pressure to said control chamber; a diaphragm in said control chamber having one side exposed to evaporator inlet pressure in said control portion and a second side exposed to a substantially constant pressure; means including said valve rod for operatively connecting said diaphragm and said valve member for opening said passage in response to decreasing pressure in said control chamber which acts against said diaphragm and for closing said passage in response to increasing refrigerant pressure; a movable seal member connected to said valve rod to prevent refrigerant leakage between said metering chamber and said control chamber; said seal member having an area exposed to refrigerant pressure in said inlet of said expansion valve greater than the area of said valve member exposed to the same pressure to produce a closing force on said connected valve rod and valve member with increasing pressure in the expansion valve inlet.

3. Improved expansion valve means for an automobile air conditioning system including an evaporator, a refrigerant compressor and a condenser in refrigerant flow relationship, the improvement comprising: expansion valve means including a tubular housing with a wall member therein separating the housing into a control chamber portion and a metering chamber portion; an inlet to said metering portion adapted to be fluidly connected to the outlet of the condenser; an outlet from said metering portion adapted to be fluidly connected to the inlet of the evaporator; a valve seat member within said metering portion and across the interior of said tubular housing between said inlet and said outlet; said valve seat member having a passage through which refrigerant flows from the compressor and condenser to the evaporator; a valve member movable with respect to said valve seat member to open and close said passage for controlling the flow of refrigerant through said passage and into the evaporator; a valve rod connected to said valve member and extending through said metering portion and said wall member into said control chamber; means adapted for fluidly connecting said control chamber with the inlet of the evaporator for transmitting evaporator inlet pressure to said control chamber; a diaphragm in said control chamber adapted to have one side exposed to evaporator inlet pressure in said control chamber and a second side exposed to a substantially constant pressure; means including said valve rod operatively connecting said diaphragm and said valve member for opening said passage in response to decreasing pressure in said control chamber and for closing said passage in response to increasing refrigerant pressure in said control chamber.

* * * * *